United States Patent
Carmignani et al.

(10) Patent No.: US 10,513,188 B2
(45) Date of Patent: Dec. 24, 2019

(54) RECHARGEABLE BATTERY PACK FOR ELECTRIC OR HYBRID VEHICLES COMPRISING A COMMUNICATION INTERFACE

(71) Applicant: PIAGGIO & C. S.P.A., Pontedera (Pisa) (IT)

(72) Inventors: Luca Carmignani, Pontedera (IT); Andrea Grassi, Pontedera (IT); Luca Nuti, Pontedera (IT)

(73) Assignee: PIAGGIO & C. S.P.A., Pontedera (Pisa) (IT)

( * ) Notice: Subject to any disclaimer, the term of this patent is extended or adjusted under 35 U.S.C. 154(b) by 0 days.

(21) Appl. No.: 15/518,796

(22) PCT Filed: Oct. 30, 2015

(86) PCT No.: PCT/IB2015/058402
§ 371 (c)(1),
(2) Date: Apr. 13, 2017

(87) PCT Pub. No.: WO2016/067263
PCT Pub. Date: May 6, 2016

(65) Prior Publication Data
US 2017/0240052 A1 Aug. 24, 2017

(30) Foreign Application Priority Data

Oct. 31, 2014 (IT) .............................. RM2014A0628

(51) Int. Cl.
*B62J 99/00* (2009.01)
*B60L 11/00* (2006.01)
(Continued)

(52) U.S. Cl.
CPC ............. *B60L 11/007* (2013.01); *B62J 99/00* (2013.01); *B62M 6/40* (2013.01); *H02J 7/0021* (2013.01);
(Continued)

(58) Field of Classification Search
CPC ............... B60L 11/007; B60L 11/1877; B60L 2200/12; B60L 2240/622; B60L 2270/34;
(Continued)

(56) References Cited

U.S. PATENT DOCUMENTS 6,504,344 B1 * 1/2003 Adams ............... G01R 31/3658
320/132
2009/0255747 A1 * 10/2009 Kasaba .................. B62D 51/02
180/208
(Continued)

FOREIGN PATENT DOCUMENTS

| CN | 202121022 U | 1/2012 |
| WO | 2013175153 A2 | 11/2013 |
| WO | 2013179208 A1 | 12/2013 |

OTHER PUBLICATIONS

International Search Report for PCT/IB2015/058402 dated Jan. 2, 2016.

*Primary Examiner* — Mohamed Barakat
(74) *Attorney, Agent, or Firm* — Cantor Colburn LLP

(57) ABSTRACT

A rechargeable battery pack (20) for an electric or hybrid vehicle (1), comprising: at least one electric connection member (23) to a powertrain unit (5) of the electric or hybrid vehicle (1); a plurality of mutually electrically connected cells (30); at least one first circuit block (40) integrated in the rechargeable battery pack (20) and comprising a radio communication interface (45).

20 Claims, 4 Drawing Sheets

(51) Int. Cl.
  *B62M 6/40*   (2010.01)
  *H02J 7/00*   (2006.01)
  *H04B 1/38*   (2015.01)
  *G01S 19/16*  (2010.01)

(52) U.S. Cl.
  CPC ............ *H04B 1/38* (2013.01); *B60L 2200/12* (2013.01); *B60L 2240/622* (2013.01); *B60L 2270/34* (2013.01); *B62J 2099/0013* (2013.01); *G01S 19/16* (2013.01); *Y10S 903/00* (2013.01)

(58) Field of Classification Search
  CPC .... B62J 99/00; B62J 2099/0013; B62M 6/40; H02J 7/0021; H04B 1/38; H04W 4/028; G01S 19/16; Y10S 903/00
  See application file for complete search history.

(56) References Cited

U.S. PATENT DOCUMENTS

| | | | | |
|---|---|---|---|---|
| 2012/0143397 A1* | 6/2012 | Mackay | ............... | B60R 25/1025 701/1 |
| 2012/0239344 A1* | 9/2012 | Hasegawa | ............... | G01C 21/26 702/150 |
| 2013/0154358 A1* | 6/2013 | Kai | .................... | B60R 16/0232 307/9.1 |
| 2013/0338865 A1* | 12/2013 | Kryze | ................ | B60L 11/1851 701/22 |
| 2014/0282075 A1* | 9/2014 | Alfaro | .................... | H04L 67/22 715/751 |
| 2014/0292283 A1* | 10/2014 | Timmons | ............ | B60L 11/1809 320/152 |
| 2014/0316305 A1* | 10/2014 | Venkatraman | ........ | A61B 5/1112 600/595 |

* cited by examiner

RECHARGEABLE BATTERY PACK FOR ELECTRIC OR HYBRID VEHICLES COMPRISING A COMMUNICATION INTERFACE

CROSS-REFERENCE TO RELATED APPLICATION

This application is the 35 U.S.C. § 371 national stage application of PCT Application No. PCT/IB2015/058402, filed Oct. 30, 2015, where the PCT claims priority to and the benefit of, IT Patent Application No. 102014902306003, filed Oct. 31, 2014, both of which are herein incorporated by reference in their entireties.

FIELD OF THE INVENTION

The present invention refers to the technical field of the electric or hybrid vehicles, and in particular concerns a rechargeable battery pack for electric or hybrid vehicles comprising a communication interface.

KNOWN ART

As it is known in the transportation field, the electric or hybrid vehicles are establishing themselves always more successfully.

The above-mentioned vehicles include at least one rechargeable battery pack adapted to supply an electrical machine acting as sole powertrain in the electrical vehicles or as auxiliary powertrain in the hybrid vehicles, in which it just supports a thermal engine. In the hybrid vehicles, when the propulsion to the vehicle is provided by the thermal engine, the above-mentioned electrical machine is used as a generator to recharge the battery pack. To the rechargeable battery pack, it is generally associated an electronic system monitoring the charge status of the battery pack and managing the charge thereof, being defined *battery management system*.

Currently, in order to exchange information with the rechargeable battery pack of a vehicle, for example in order to transmit data to the battery pack or to receive data from the battery pack, it is necessary to provide some dedicated electronics and software installed on board of the vehicle, in general during the production step of the vehicle itself. This causes a lack of flexibility, both qualitative and quantitative, related to the data that is possible to exchange with the battery pack.

Therefore, the purpose of the present description is to provide a solution that is adapted to overcome, or reduce at least in part, the limitations of the above-described known art.

That purpose is achieved by means of a rechargeable battery pack as defined in general in claim 1. Preferred and advantageous embodiments of the above-mentioned battery pack are defined in the appended dependent claims.

The invention will be better understood from the following detailed description of a particular embodiment made by way of non-limiting example, referring to the attached drawings being synthetically described in the following paragraph.

DETAILED DESCRIPTION

Figure 1:
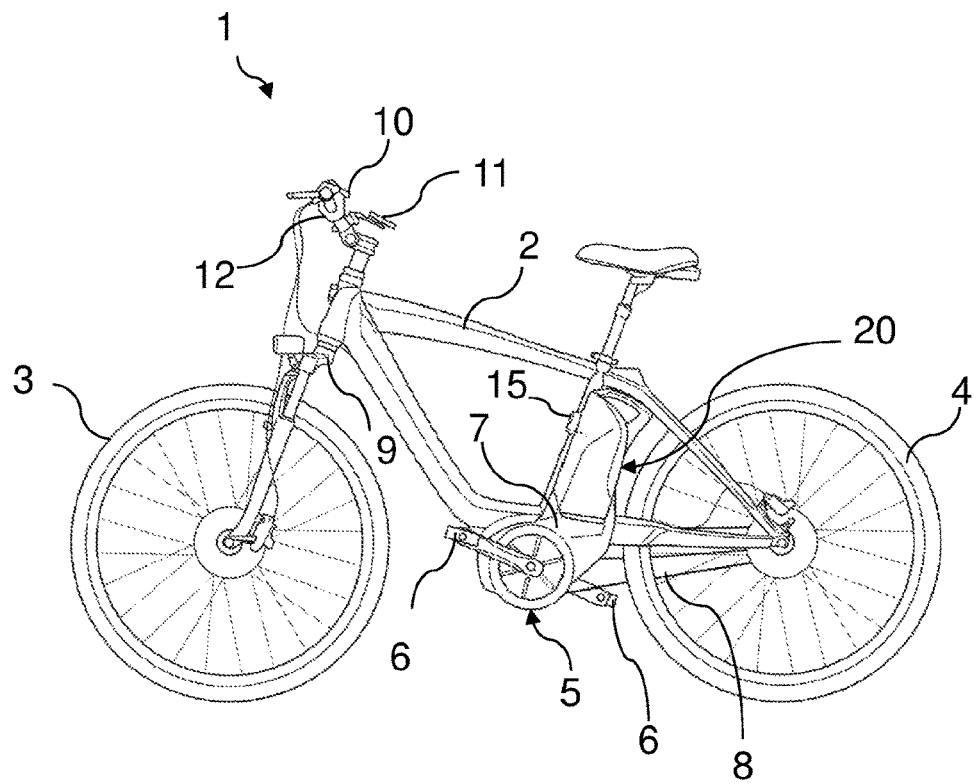
FIG. 1 show a side view of an electric or hybrid vehicle, which in the particular explanatory and non-limiting embodiment being depicted is a pedal-assist bicycle.
Figure 2:
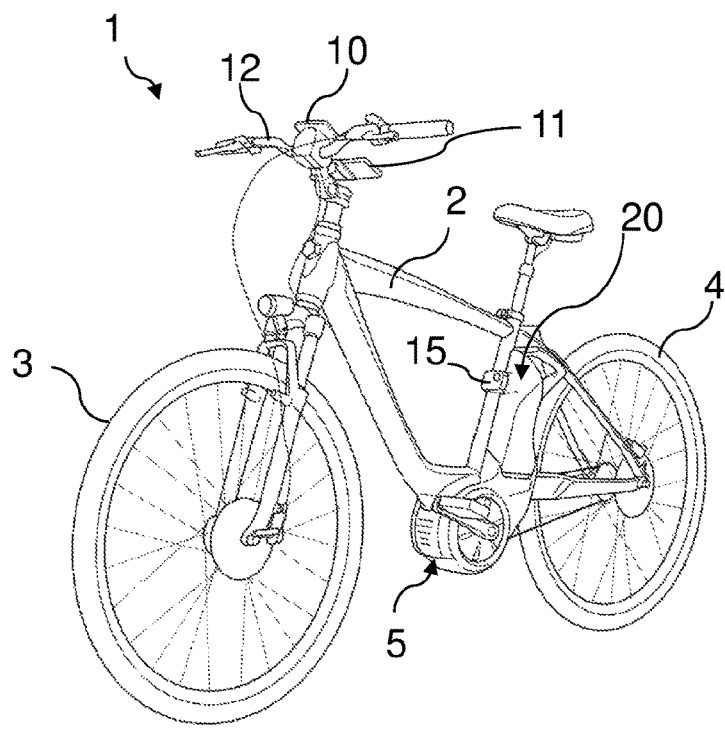
FIG. 2 shows a tridimensional view from the front side of the vehicle of FIG. 1.

Referring to FIG. 1, a vehicle 1 is depicted in it, which is, in the particular example being described, an electrical bicycle or better a pedal-assist bicycle (EPAC). However, it must be kept in mind that the teachings of the present description and the claimed protection scope are not limited by all means to the above-mentioned specific vehicle type. Actually, the vehicle 1 could be for example an electrical or hybrid motorcycle, with two or three wheels or an auto-balanced vehicle with two wheels on an axis, or an electric or hybrid vehicle with four wheels, etc. or in general, any vehicle provided with a rechargeable battery pack and adapted to provide propulsive energy to the vehicle. From now on, in the present description, the vehicle 1 will be referred to generally with the expression bicycle 1, without introducing any limitation for that reason.

The bicycle 1 comprises a frame 2, a front wheel 3 and a rear wheel 4 being pivotally hinged to the frame 2. In a way being known per se, the front wheel 3 is pivotally hinged to a steering forecarriage 9 of the bicycle 1 being pivotally constrained to the frame 2. The bicycle 1 comprises handlebars 12 pivotally hinged to the frame 2 and rotationally integral with the front wheel 3.

The bicycle 1 comprises a powertrain group 5 comprising a chassis 7 being fastened to the frame 2, a pair of pedals 6 and an electrical machine (not visible in the figures, because it is enclosed in the chassis 7), which in the example acts both as electrical motor and as electrical generator. In the depicted example, the powertrain group 5 is operatively connected to the rear wheel 4 by means of a chain transmission system 8.

Figure 3:
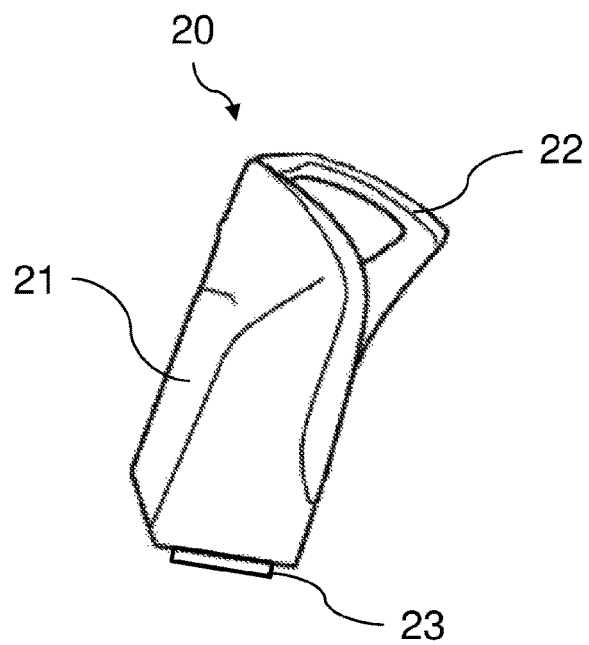
FIG. 3 shows a side view of a rechargeable battery pack of the vehicle of FIG. 1.

The bicycle 1 also comprises a rechargeable battery pack 20, comprising a chassis 21 fastened to the frame 2 of the bicycle 1, being preferably removable and fastenable to the frame 2 by means of a mechanical fastening system 15, for example a lock and key one. Referring to FIG. 3, in the depicted example, the rechargeable battery pack 20 comprises a connection portion 23 inserted/insertable in a dedicated seat being provided in the chassis 7 of the powertrain group 5. The connection portion 23 allows mechanically and electrically coupling the powertrain group 5 and the rechargeable battery pack 20 with each other.

Figure 7:
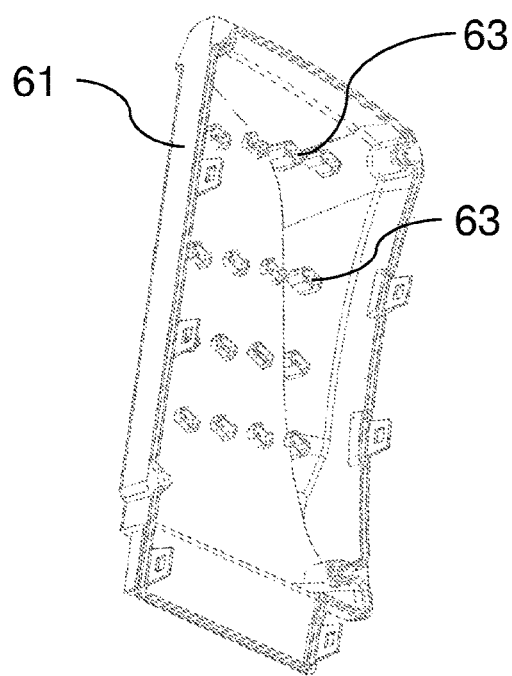
FIG. 7 shows a tridimensional view of a first half-shell of the rechargeable battery pack of FIG. 3.
Figure 8:
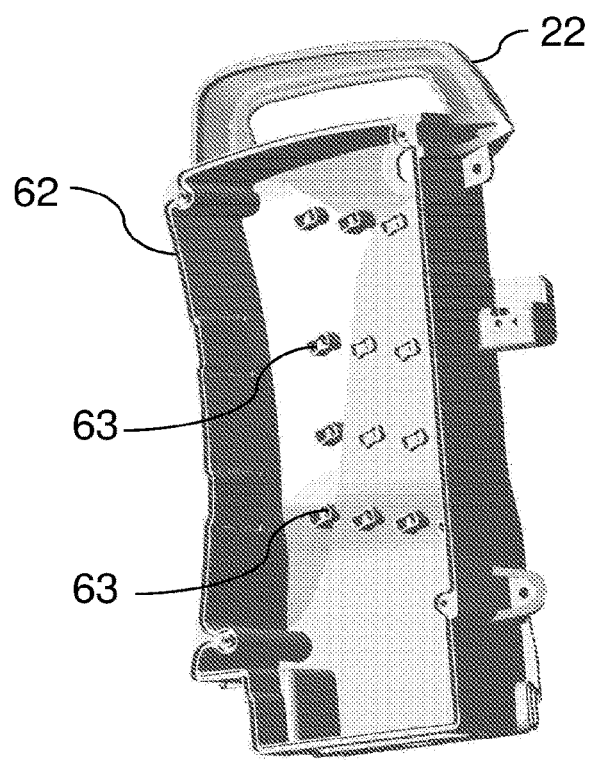
FIG. 8 shows a tridimensional view of a second half-shell of the rechargeable battery pack of FIG. 3, couplable to the first half-shell of FIG. 7 in order to form a chassis of the rechargeable battery pack.

Always referring to FIG. 3, according to one preferred embodiment, the chassis 21 of the rechargeable battery pack 20 comprises an ergonomic handle 22, adapted to facilitate the removal of the rechargeable battery pack 20 from the bicycle 1 and its transportation after the removal. In the example, such a removal can occur after unlocking the mechanical fastening system 15, in the example a lock and key one. Referring to FIGS. 7 and 8, the chassis 21 of the rechargeable battery pack 20 comprises a first half-shell 61 and a second half-shell 62 being mechanically coupled to each other. Preferably, the above-mentioned chassis 21 is a waterproof container.

According to one embodiment, the electrical machine of the powertrain group 5 takes energy from the rechargeable battery pack 20, in the example in order to assist the pedal, thus acting as powertrain and at the same time it is such to provide energy to the rechargeable battery pack 20 in order to recharge the latter, thus acting as generator. The driver of the bicycle 1 can select one among different operating modes based on the specific needs of being facilitated in the pedaling or recharging the rechargeable battery pack 20. The operating modes can also be automatically selected by a processor based on signals being provided by one or more sensors, such as for example, velocity sensors, acceleration sensors, slope sensors, etc.

Figure 5:
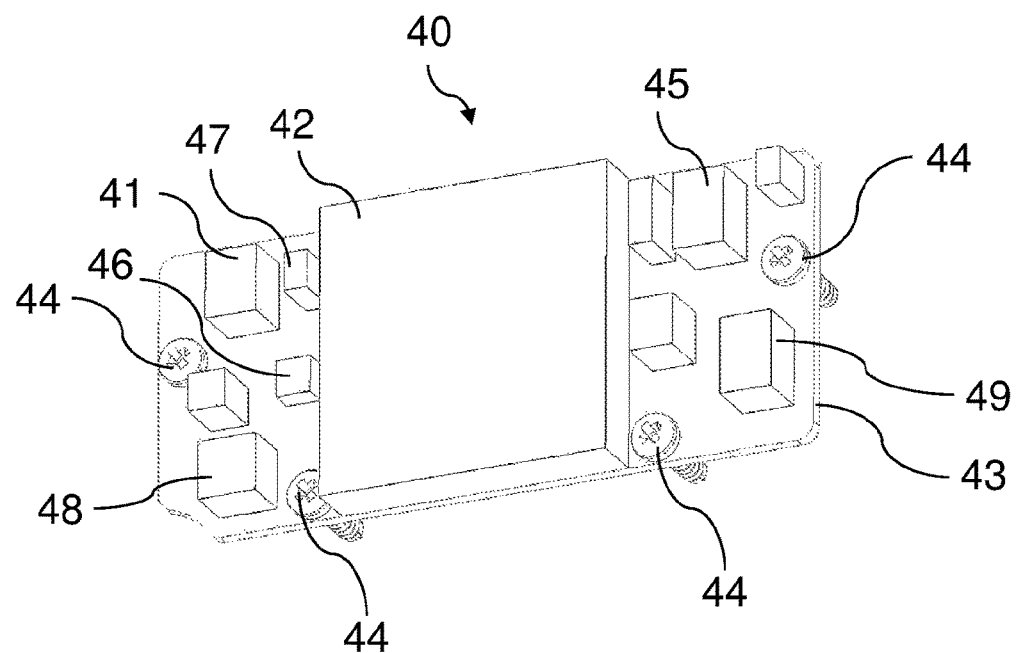
FIG. 5 shows a tridimensional view of a first circuit block of the rechargeable battery pack of FIG. 3.
Figure 6:
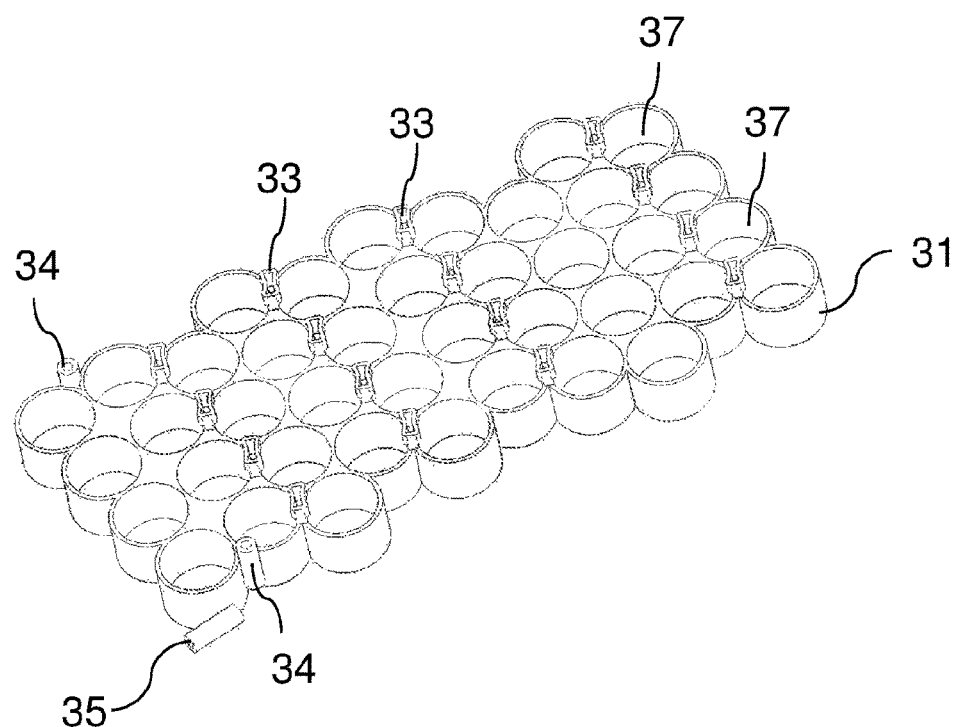
FIG. 6 shows a tridimensional view of a support device of a plurality of cells of the rechargeable battery pack of FIG. 3.

Referring to FIG. 5, the rechargeable battery pack 20 comprises a plurality of rechargeable cells 30 being electrically connected to each other, for example in series, and a first circuit block 40 being integrated in the rechargeable battery pack 20.

The first circuit block 40 comprises a radio communication interface 45 being configured to communicate data remotely. Preferably, the above-mentioned communication interface is a bidirectional interface, and allows the first circuit block 40 to both receive and transmit data. Preferably, the rechargeable battery pack 20 is configured so that the above-mentioned interface allows communicating data remotely also when the battery pack 20 is removed from the bicycle 1.

Preferably, the above-mentioned radio communication interface 45 comprises a modem connecting to a cellular network, for example, a GSM/GPRS modem, or a UMTS modem or a LTE modem. In that embodiment, the first circuit block 40 also comprises a support and connection device 46 of a SIM card, in other words a SIM socket, adapted to house a SIM for the connection of the above-mentioned radio communication interface 45 to a cellular radio network of a telecommunication provider.

In one advantageous and non-limiting embodiment, the circuit block 40 comprises a receiver 41 of satellite geo-localization signals and a processing unit 42 of said signals being connected to the receiver 41 and adapted to detect a geographical positioning information of the rechargeable battery pack 20 in a geo-references system. Said information is expressed by means of one or more data adapted to identify the geographical position of the rechargeable battery pack 20. For example, the receiver 41 of satellite geo-localization signals is a GPS receiver. For example, the processing unit 42 is a microcontroller.

According to one embodiment, the radio communication interface 45 is operatively connected to the data processing unit 42 in order to remotely communicate the detected satellite geo-localization information.

The above-mentioned plurality of cells 30 and the above-mentioned first circuit block 40 are contained inside the chassis 21 of the rechargeable battery pack 20.

Referring to FIG. 5, according to one embodiment, the first circuit block 40 comprises a printed circuit board 43 on which the different components of the first circuit block 40 are mounted, such as the radio communication interface 45, the receiver 41 and the processing unit 42. The receiver 41 and the processing unit 42, although being shown in FIG. 5 as two separated devices, can also be physically integrated in a single hardware device.

Figure 4:
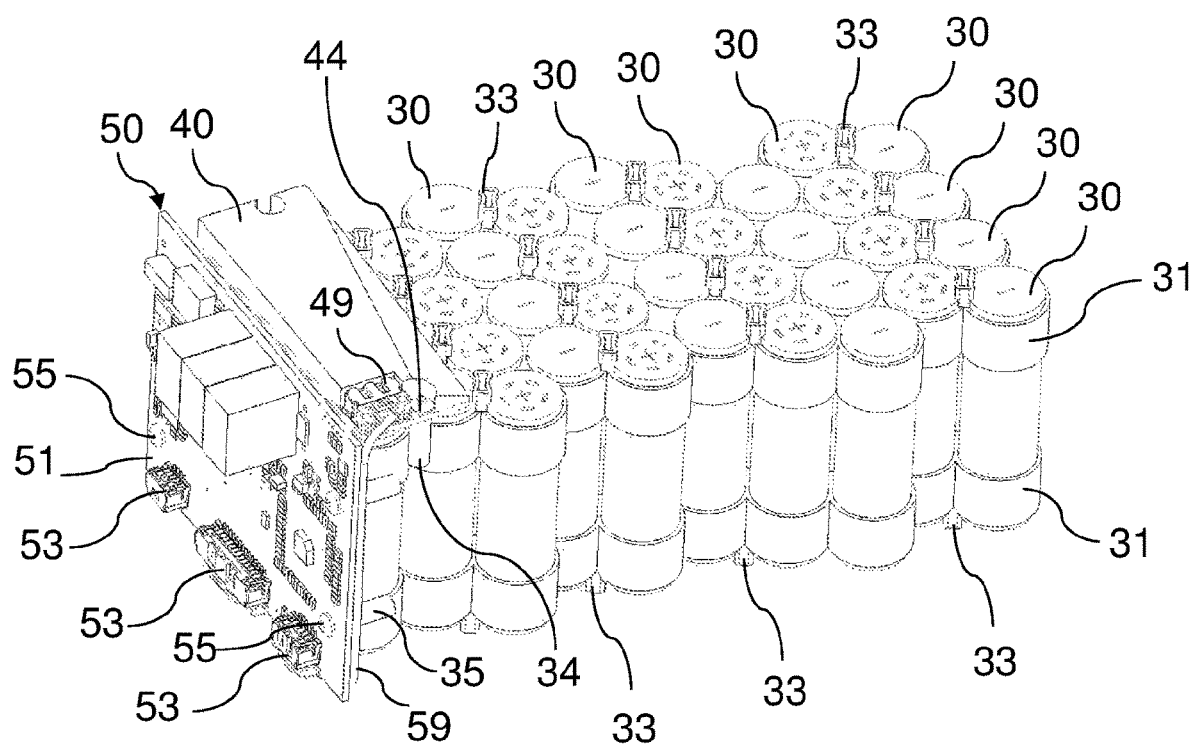
FIG. 4 shows a tridimensional view of some internal components of the rechargeable battery pack of FIG. 3.

It is necessary to bear in mind that the (merely explicative) details of FIG. 5 are not visible in FIG. 4 because, regarding the first circuit block 40 in FIG. 4, basically it was shown its overall dimensions.

According to one embodiment, the first circuit block 40 also comprises an inertial accelerometer 47 operatively connected to the processing unit 42, for example a MEMS three-axis accelerometer.

According to one embodiment, the first circuit block 40 is such to stay normally in a power-down state or in general in a low or reduced power consumption state in order to activate periodically and/or when an event occurs and reach a higher power consumption state, at preset time intervals, in order to detect the geographical position of the rechargeable battery pack 20 and evaluate whether a variation of the geographical position occurred or not with respect to a previously detected geographical position being for example stored in an internal data memory of the processing unit 42 or in an external one being operatively connected thereto. For example, the above-mentioned event causing the switching from the low or reduced power consumption state to the higher power consumption state of the circuit block 40 is a mechanical shock being detected by the inertial accelerometer 47 which is greater than a given threshold value, for example caused by:

- a tampering/non-authorized opening attempt of the chassis 21, that is the forcing of a mechanical tamper-proof system such as the one described for example in the following paragraphs [0039]-[0041]; and/or
- a removal attempt of the chassis 21 from the frame of the bicycle 1, for example by forcing the mechanical fastening system 15. Actually, it is possible to set the above-mentioned threshold value so that the circuit block 40 detects anomalous mechanical shocks, which are not compatible with the permanence of the bicycle 1 in a parking state. According to one further embodiment, what described in the present paragraph happens when the bicycle 1 is in a parking state, as described in more detail in the following paragraph [0033], while when the bicycle 1 is in authorized use state, as described for example in the following paragraph [0035], the first circuit block 40 stays in the higher power consumption state, for example in order to use the receiver 41 of satellite geo-localization signals and the processing unit 42 in order to carry out functions such as: path tracing, path calculation to be executed on a map, estimate of motion parameters such as the velocity of the bicycle 1 and/or the covered distance.

According to one embodiment, starting from the parking state of the bicycle 1 when detecting a geographical position variation, the first circuit block is configured to send a first alarm signal via the radio communication interface 45. That first alarm signal preferably contains information about the new detected geographical position. That alarm signal for example is sent as text or data message to a personal communication mobile device of the lawful owner of the bicycle 1 or as push notification in an application program installed on board of said personal communication mobile device or as email, etc. The above-mentioned personal communication mobile device for example is a smartphone.

According to one embodiment, the first circuit block 40 is such to receive an authentication code in order to identify the authorized use state of the bicycle 1. Without such an authentication code or with a wrong code, the first circuit block 40 is such to detect that the bicycle 1 is in the parking state. According to that embodiment, the first alarm signal is sent if the first circuit block 40 identifies that the bicycle 1 is in the parking state and that there has been a geographical position variation. Preferably, in that case the first circuit block 40 identifies that the bicycle is in the state named possible theft state, switching to the higher consumption state, in order to be able to allow the real time tracing of the position of the bicycle 1.

According to one further embodiment, the first circuit block 40 is configured to detect the geographical position of the rechargeable battery pack 20, and thus of the bicycle 1, when detecting a switching between the authorized use state and the parking state and it is such to store the detected geographical position in order to execute a following detection of geographical position after a time interval to evaluate a geographical position variation or the permanence of the bicycle 1 in the same geographical position.

For example, in order for the first circuit block 40 to be able to distinguish between authorized use state and parking state, it is possible to consider that the bicycle 1 includes a removable dashboard 10 being logically coupled to the rechargeable battery pack 20, for example in particular coupled to the first circuit block 40, and adapted to provide a signal having an authentication code to the first circuit block 40. The above-mentioned removable dashboard 10 for example is removably fastened to the handlebars 12, for example on a suitable anchoring station fastened to the handlebars 12. The removal of the dashboard 10 causes the missing of the authentication signal (that is, the first circuit block 40 unsuccessfully receiving the authentication code) thus the identification of the parking state. Starting from that state, the coupling to the bicycle 1 of a dashboard 10 being not logically paired to the first circuit block 40 does not cause the detection of the switching to the authorized use state but the permanence in the parking state or the detection of the switching to a further state, for example to the possible theft state being representative of a theft attempt. Alternatively or additionally to the removable dashboard 10, it is possible to consider that the above-mentioned signal having the authentication code is provided to the first circuit block 40 by a personal communication portable device, such as for example a smartphone being logically paired to the rechargeable battery pack 20, for example in particular paired to the first circuit block 40. In that case, the first circuit block 40 for example is provided with a short-range communication interface 48, for example a Bluetooth interface, in order to communicate with the smartphone. Referring to FIG. 1, in this embodiment the bicycle 1 can include a support and fastening bracket 11 for a smartphone.

The presence of the radio communication interface 45, both with and without providing the signals receiver of satellite geo-localization 41, has further advantages and solves further technical problems. Actually, thanks to the above-mentioned radio communication interface 45, the first circuit block 40 for example can send information remotely about the battery charge status and/or about the geographical position of the bicycle 1 in case of theft/loss and/or help requests and/or it can dialog with an application program being installed on board of a personal communication portable terminal in order to provide useful or entertaining information, such as usage statistics of the bicycle 1 and/or performances such as information about velocity, acceleration, slope, covered kilometers, burnt calories, and/or information about the absolute or time-based $CO_2$ savings being obtained by the use of the bicycle 1.

According to one embodiment, the first circuit block 40 is such to identify that the charge status of the rechargeable battery pack 20 is lower than a preset threshold, and for that reason, it is able to send a corresponding charge depletion alarm message via the radio communication interface 45.

Referring to FIGS. 3-6, according to one embodiment, the rechargeable battery pack 20 comprises a plurality of cells 30 and at least one support device 31 for the plurality of cells 30 being adapted to mechanically couple the loose cells 30 to each other in order to define a plurality of packed cells 30 (or "cells pack"). For example, the support device 31 is a jig comprising a plurality of seats 37 each of them receiving and holding a respective cell 30. The jig for example is made of electrically isolating rigid plastic material and comprises seats 37 in the form of circular through openings each of them being crossed by a respective cell 30. In the particular example being depicted, the rechargeable battery pack 20 comprises two jigs 31 of the above-described type, arranged parallel to each other.

According to one advantageous embodiment, the rechargeable battery pack 20 comprises at least one fastening element 44 adapted to permanently fasten the first circuit block 40 to the plurality of cells 30, for example in an irreversible way. For the purpose of the present description, by irreversible it is meant a fastening not allowing the disengagement between two entities being coupled by the above-mentioned fastening without causing a damage in at least one of the two entities. The above-mentioned fastening element 44 for example includes screws 44 that cannot be removed without breaking the screws themselves or the support device 31, once inserted and screwed in respective threaded seats 34 being provided for in the support device 31 of the plurality of cells 30. The above-mentioned fastening element 44 represents a first example of a mechanical tamper-proof system adapted to prevent/discourage the removal of the first circuit block 40 from the rechargeable battery pack 20.

According to an alternative or additional system, it is possible to consider for example that the chassis 21 of the rechargeable battery pack 20 is provided with a mechanical tamper-proof system adapted to prevent/discourage the removal of the first circuit block 31 from the battery pack 20. This can be achieved in several ways. For example, the two half-shells 61, 62 can be coupled to each other in an irreversible way (that is, in a way they cannot be disengaged without causing a damage in at least one of the half-shells), or they can be coupled with a proprietary mechanical fastening system that needs special tools to be removed, which are in use only to the authorized staff. The above-described examples represent further examples of mechanical tamper-proof systems adapted to prevent/discourage the removal of the first circuit block 40 from the rechargeable battery pack 20.

According to a further alternative or additional tamper-proof system, it is possible to consider that for example the chassis 21 of the rechargeable battery pack 20 has elements 63 causing the cells pack 30 to break when trying to open the two half-shells 61, 62. In the specific example being depicted in the figures, conjugated hooking elements 33, 63 having irreversible joint are provided for between each supporting device 32 of the cells and a respective half-shell 61, 62. Once the half-shells 61, 62 are closed, the fitting between the above-mentioned hooking elements 33, 63 is carried out. When trying to open and separate the half-shells 61, 62 from each other, at the beginning some resistance is encountered, then applying more force each half-shell 61, 62, due to the irreversible joint, drags the respective support device 31 therewith, thus determining the splitting apart of the cells pack due to the cells 30 sliding out of their respective seats 37 and subsequently coming out therefrom, eventually breaking the electrical connections between the different cells.

It should be noted that the above-mentioned mechanical tamper-proof system can be provided for additionally or alternatively to the mechanical fastening system 15.

According to one embodiment, the battery pack also includes a second circuit block 50 to monitor and manage the charge status of the battery pack 20. That circuit block 50 is operatively connected to the powertrain group 5 when the battery pack 20 is operatively connected to the bicycle 1.

The first circuit block 40 and the second circuit block 50 preferably are electrically connected to each other. For example, said circuit blocks 40, 50 can be made on the same printed circuit board or, as in the depicted example in the figures, they can be made on different circuit boards 43, 51 and be electrically connected to each other for example by means of a connector 49 and a multipolar cable 59. In the particular example being depicted, the second circuit block 50 comprises a circuit board 51 being fastened to the cells 30 by means of screws 55 that are mounted in respective seats 35 provided for in the support device 31 of the cells 30.

Both the above-mentioned circuit blocks 40, 50 can be powered directly or indirectly by the cells 30. For example, in case the two circuit blocks 40, 50 are separated:
- each block can be powered individually by the cells pack 30;
- one block can be powered from the cells pack 30 and then it can supply the other block.

Referring to FIGS. 3 and 4, the rechargeable battery pack 20 comprises one or more electrical connectors 23 (in the example three connectors 23) in the connection portion 23 allowing electrically connecting the rechargeable battery pack 20 and, in the specific and non-limiting case, the second circuit block 50, with the powertrain group 5. In the particular example being depicted, at least one of said connectors 23 is needed to connect the first circuit block 40 with the dashboard 10 (if provided for), via the second circuit block 50. The above-mentioned electrical connectors 23 represent at least one electrical connection element of the rechargeable battery pack 20 with the powertrain group 5.

As it is clear from the above, the proposed rechargeable battery pack 20 allows fully obtaining the intended objects in terms of overcoming the drawbacks of the known art.

It should be noted that the description made above for the vehicle 1 and the rechargeable battery pack 20 also corresponds to the description of a kit of parts comprising the electrical pedal-assist bicycle 1 and an application program being downloadable and installable on board of a personal communication mobile device, such as for example a smartphone, and being adapted to be executed in order to receive and/or transmit data with the rechargeable battery pack 20 via the above-mentioned radio communication interface 45.

Given the principle of the invention, the embodiments and the realization details could be widely varied with respect to what has been described and shown by way of non-limiting example, without for that reason departing from the scope of the invention as defined in the attached claims.

The invention claimed is:

1. A kit of parts, comprising:
   a pedal-assisted bicycle comprising a powertrain unit;
   a rechargeable battery pack, comprising:
   at least one electric connection member to the powertrain unit of the pedal-assisted bicycle;
   a plurality of mutually electrically connected cells; and
   at least one first circuit block integrated in the rechargeable battery pack and comprising a radio communication interface, wherein the first circuit block is adapted to identify that a charge state of the rechargeable battery pack is lower than a predetermined threshold and the first circuit block is adapted to send a corresponding charge running out alarm message through the radio communication interface; and
   an application program downloadable and installable on board of a mobile personal communication device and adapted to be run to receive and transmit data with the rechargeable battery pack through said radio communication interface,
   wherein the alarm message is sent to the mobile personal communication device as a push notification in the application program; and
   wherein said at least one electric connection member of said battery pack is insertable in a dedicated seat being provided in a chassis of the powertrain unit, said connection member allowing mechanically and electrically coupling of the powertrain unit and the rechargeable battery pack with each other such that there is a direct connection between the battery pack and the powertrain unit.

2. The kit of parts according to claim 1, wherein the radio communication interface is a bidirectional communication interface and allows the first circuit block transmitting and receiving data from remote.

3. The kit of parts according to claim 1, wherein the radio communication interface comprises a modem for the connection to a cellular radio network.

4. The kit of parts according to claim 3, wherein the first circuit block further comprises a support and connection device of a SIM card, which is adapted to house said SIM for the connection of the radio communication interface to a cellular radio network.

5. The kit of parts according to claim 1, wherein the first circuit block comprises a receiver of satellite geo-localization signals and a data processing unit of said signals, which is operatively connected to said receiver and adapted to detect a piece of information of geographic positioning of the rechargeable battery pack in a geo-referenced system, and wherein said radio communication interface is operatively connected to said data processing unit for communicating from remote the detected satellite geo-localization piece of information.

6. The kit of parts according to claim 5, wherein the first circuit block is configured to remain normally in a state of low or reduced energy consumption, to then activate periodically and reach a higher consumption state, at predetermined time intervals, to detect the geographic position of the rechargeable battery pack and to assess whether a position change with respect to a geographic position previously detected has occurred.

7. The kit of parts according to claim 5, wherein said first circuit block, upon detecting a geographic position change, is configured to send a first alarm signal through the radio communication interface.

8. The kit of parts according to claim 1, wherein the first circuit block is such as to receive an authentication code in order to identify a state of authorized use of the pedal-assisted bicycle.

9. The kit of parts according to claim 1, comprising a mechanical tamper-proof system, which is adapted to prevent/discourage removal of the first circuit block from the battery pack.

10. The kit of parts according to claim 9, wherein the rechargeable battery pack comprises a plurality of cells and at least one support device of the plurality of cells, adapted to mutually mechanically coupling the cells to define a plurality of packed cells, and wherein the rechargeable battery pack comprises at least one securing member adapted to firmly secure the first circuit block to the plurality of cells.

11. The kit of parts according to claim 10, wherein said at least one securing member is configured to irreversibly secure the first circuit block to the plurality of cells.

12. The kit of parts according to claim 1, wherein said rechargeable battery pack is reversibly coupled or couplable to the powertrain unit through said at least one electric connection member.

13. The kit of parts according to claim 2, wherein the radio communication interface comprises a modem for the connection to a cellular radio network.

14. The kit of parts according to claim 6, wherein said first circuit block upon detecting a geographic position change, is configured to send a first alarm signal through the radio communication interface.

15. The kit of parts according to claim 1, wherein the at least one first circuit block is adapted to dialog with the application program on the mobile personal communication device in order to provide data regarding usage statistics and performance information of the bicycle, wherein the data comprises at least one of:
velocity, acceleration, slope, distance traveled, burnt calories, and absolute or time-based $CO_2$ savings being obtained by the use of the bicycle.

16. The kit of parts according to claim 15, wherein the radio communication interface comprises a modem for the connection to a cellular radio network.

17. The kit of parts according to claim 16, wherein the first circuit block further comprises a support and connection device of a SIM card, which is adapted to house said SIM for the connection of the radio communication interface to a cellular radio network.

18. The kit of parts according to claim 2, wherein the radio communication interface comprises a modem for the connection to a cellular radio network.

19. The kit of parts according to claim 18, wherein the first circuit block further comprises a support and connection device of a SIM card, which is adapted to house said SIM for the connection of the radio communication interface to a cellular radio network.

20. A system, comprising:
a pedal-assisted bicycle comprising a powertrain unit;
a rechargeable battery pack, comprising:
at least one electric connection member electrically coupled with the powertrain unit of the pedal-assisted bicycle;
a plurality of mutually electrically connected cells; and
an integrated circuit integrated in the rechargeable battery pack, the integrated circuit comprising a radio communication interface, wherein the integrated circuit is configured to:
identify that a charge state of the rechargeable battery pack is lower than a predetermined threshold; and
in response to the charge state being lower than the predetermined threshold, transmit, through the radio communication interface, a corresponding charge running out alarm message;
a mobile communication device comprising at least one hardware processor; and
an application executable by the at least one hardware processor of the mobile communication device adapted to receive and transmit data with the rechargeable battery pack through said radio communication interface,
wherein the alarm message is sent to the mobile personal communication device as a push notification in the application; and
wherein said at least one electric connection member of said battery pack is insertable in a dedicated seat being provided in a chassis of the powertrain unit, said connection member allowing mechanically and electrically coupling of the powertrain unit and the rechargeable battery pack with each other, such that there is a direct connection between the battery pack and the powertrain unit.

* * * * *